US010691898B2

(12) United States Patent
Sun et al.

(10) Patent No.: US 10,691,898 B2
(45) Date of Patent: Jun. 23, 2020

(54) SYNCHRONIZATION METHOD FOR VISUAL INFORMATION AND AUDITORY INFORMATION AND INFORMATION PROCESSING DEVICE

(71) Applicant: Hitachi, Ltd., Tokyo (JP)

(72) Inventors: Qinghua Sun, Tokyo (JP); Takeshi Homma, Tokyo (JP); Takashi Sumiyoshi, Tokyo (JP); Masahito Togami, Tokyo (JP)

(73) Assignee: HITACHI, LTD., Tokyo (JP)

( * ) Notice: Subject to any disclaimer, the term of this patent is extended or adjusted under 35 U.S.C. 154(b) by 222 days.

(21) Appl. No.: 15/771,460

(22) PCT Filed: Oct. 29, 2015

(86) PCT No.: PCT/JP2015/080574
§ 371 (c)(1),
(2) Date: Aug. 6, 2018

(87) PCT Pub. No.: WO2017/072915
PCT Pub. Date: May 4, 2017

(65) Prior Publication Data
US 2018/0336891 A1 Nov. 22, 2018

(51) Int. Cl.
G06F 40/40 (2020.01)
H04N 21/2343 (2011.01)
(Continued)

(52) U.S. Cl.
CPC ............ G06F 40/40 (2020.01); B25J 9/1692 (2013.01); B25J 9/1694 (2013.01); B25J 9/1697 (2013.01);
(Continued)

(58) Field of Classification Search
CPC ...................................................... G06F 40/40
See application file for complete search history.

(56) References Cited

U.S. PATENT DOCUMENTS 8,874,429 B1* 10/2014 Crosley ................... H04N 5/05
704/2
2003/0085901 A1* 5/2003 Peleg ................... G11B 27/028
345/473

(Continued)

FOREIGN PATENT DOCUMENTS

JP 06-253197 A 9/1994
JP 08-220985 A 8/1996
(Continued)

OTHER PUBLICATIONS

Jess: An Automated Japanese Essay Scoring System, Japanese Society of Computational Statistics, 2003, vol. 16, No. 1, pp. 3-18.
(Continued)

Primary Examiner — Douglas Godbold
(74) Attorney, Agent, or Firm — Mattingly & Malur, PC

(57) ABSTRACT

Disclosed is a method for synchronizing visual information and auditory information characterized by extracting visual information included in video, recognizing auditory information in a first language that is included in a speech in the first language, associating the visual information with the auditory information in the first language, translating the auditory information in the first language to auditory information in a second language, and editing at least one of the visual information with the auditory information in the second language so as to associate the visual information and the auditory information in the second language with each other.

14 Claims, 12 Drawing Sheets

(51) Int. Cl.

| | | |
|---|---|---|
| *H04N 21/234* | (2011.01) | |
| *H04N 21/44* | (2011.01) | |
| *H04N 21/439* | (2011.01) | |
| *H04N 21/233* | (2011.01) | |
| *H04N 21/4402* | (2011.01) | |
| *G06F 40/45* | (2020.01) | |
| *G06F 40/58* | (2020.01) | |
| *G06F 40/194* | (2020.01) | |
| *B25J 9/16* | (2006.01) | |
| *G10L 13/04* | (2013.01) | |
| *G10L 15/22* | (2006.01) | |
| *G10L 21/055* | (2013.01) | |
| *G10L 13/00* | (2006.01) | |
| *G10L 15/26* | (2006.01) | |

(52) U.S. Cl.
CPC ............ *G06F 40/194* (2020.01); *G06F 40/45* (2020.01); *G06F 40/58* (2020.01); *G10L 13/043* (2013.01); *G10L 15/22* (2013.01); *G10L 21/055* (2013.01); *H04N 21/233* (2013.01); *H04N 21/23418* (2013.01); *H04N 21/234336* (2013.01); *H04N 21/4394* (2013.01); *H04N 21/44008* (2013.01); *H04N 21/440236* (2013.01); *G10L 13/00* (2013.01); *G10L 15/26* (2013.01)

(56) References Cited

U.S. PATENT DOCUMENTS

| | | | | |
|---|---|---|---|---|
| 2006/0136226 A1* | 6/2006 | Emam | .................... | H04N 5/222 704/277 |
| 2007/0165022 A1* | 7/2007 | Peleg | .................... | G06T 13/40 345/419 |
| 2011/0138433 A1* | 6/2011 | Whiteing | ............... | H04N 5/602 725/114 |
| 2012/0105719 A1* | 5/2012 | Fratti | .................. | H04N 21/8106 348/462 |
| 2012/0276504 A1* | 11/2012 | Chen | ...................... | G09B 5/067 434/157 |
| 2014/0160134 A1* | 6/2014 | Bekmambetov | ........ | G06F 40/40 345/473 |
| 2014/0372100 A1* | 12/2014 | Jeong | ...................... | G06F 40/58 704/2 |
| 2015/0181306 A1* | 6/2015 | Innes | .................. | H04N 21/4122 725/74 |
| 2015/0199978 A1* | 7/2015 | McCoy | .................... | G10L 21/10 704/270 |
| 2016/0042766 A1* | 2/2016 | Kummer | .............. | G11B 27/036 386/285 |

FOREIGN PATENT DOCUMENTS

| | | |
|---|---|---|
| JP | 2001-224002 A | 8/2001 |
| JP | 2002-123282 A | 4/2002 |
| JP | 2004-230479 A | 8/2004 |
| JP | 2008-306691 A | 12/2008 |

OTHER PUBLICATIONS

R. E. Donovan, "The IBM Trainable Speech Synthesis System," Proc. ICSLP, 1998, vol. 5, pp. 1703-1706.

Keiichi Tokuda, "Speech Syntehsis Based on Hidden Markov Models" SP99-61, 1999, pp. 47-54.

International Search Report of PCT/JP2015/080574 dated Jan. 26, 2016.

* cited by examiner

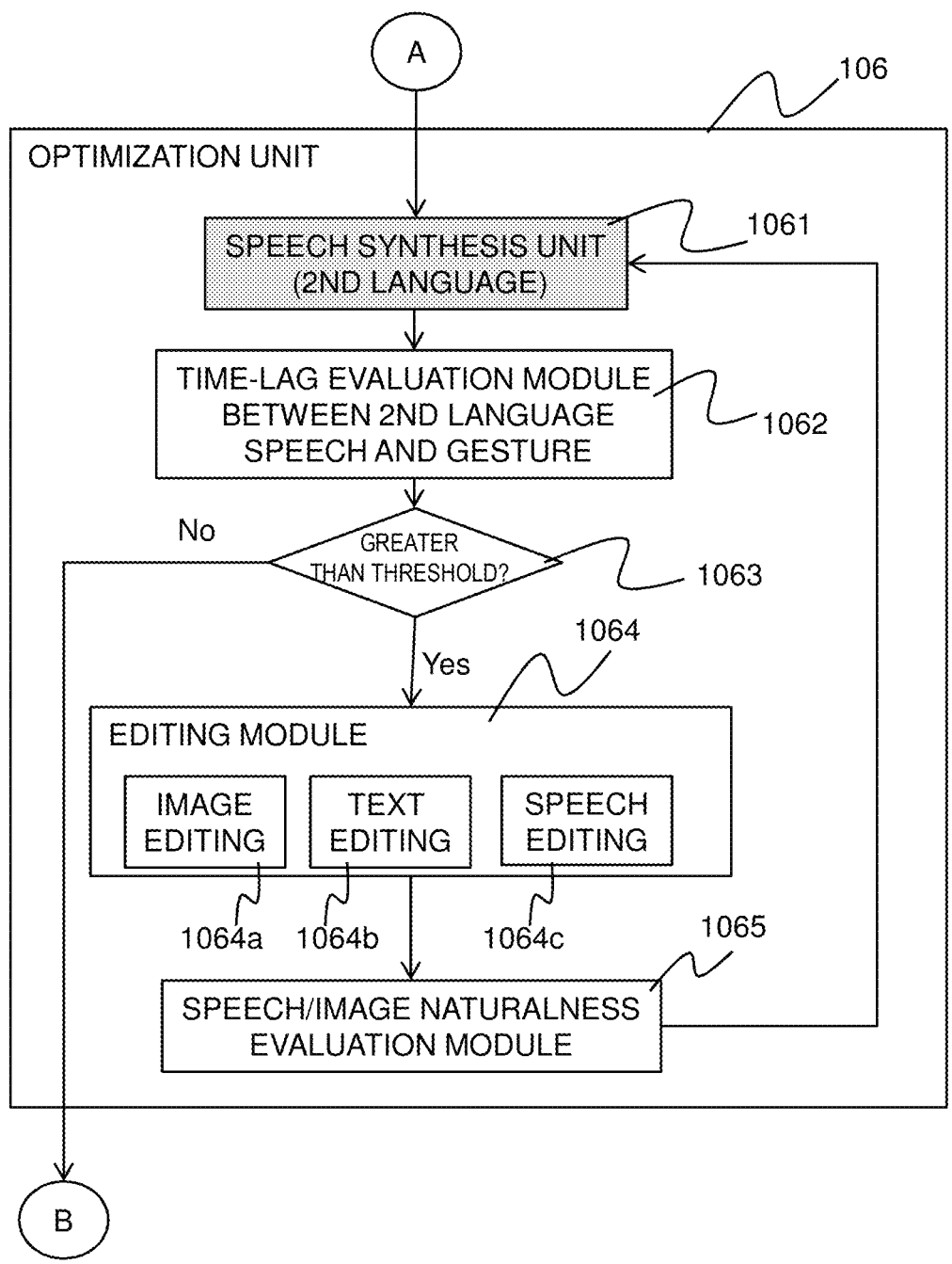

SYNCHRONIZATION METHOD FOR VISUAL INFORMATION AND AUDITORY INFORMATION AND INFORMATION PROCESSING DEVICE

TECHNICAL FIELD

The present invention relates to a technique suitable for application to devices that perform automatic speech translation, and the like. More specifically, the present invention relates to a technique for automatically generating auditory information (translated speech) in a second language as well as visual information (edited video, reproduction of motion by a robot, and the like) for the listener, from input first language auditory information (speech) and input visual information (motion of the speaker, and the like).

BACKGROUND ART

Against the background of recent significant progress in techniques such as speech recognition, machine translation, and speech synthesis, speech translation systems, which are a combination of these techniques, have been put into practical use. In such systems, an input in a first language is converted into a text in the first language by speech recognition technique. Further, the text in the first language is translated into a text in a second language by machine translation, and then is converted into a speech in the second language by a speech synthesis module corresponding to the second language. The practical application of this technique will eliminate the language barrier, thus allowing people to freely communicate with foreigners.

At the same time, in addition to auditory information from the ears, visual information from the eyes such as facial expression and gesture can greatly contribute to the transmission of meaning. For example, a gesture such as "pointing" can greatly contribute to the understanding of meaning. Thus, the motion of the speaker is transmitted to the listener through an image or a robot, to achieve more natural communication. For example, Patent Literature 1 has proposed reproduction of the motion of the speaker through a robot.

However, in a speech translation system, when a first language speech is translated into a second language speech, it is difficult to guarantee that a word with the same meaning always comes at the same time (the time relative to the beginning of the speech). Thus, mismatch (hereinafter, referred to as "time lag") occurs between the visual information from the eyes of the listener and the auditory information from the ears of the listener, which may significantly impair understanding of the meaning.

The conventional method (Patent Literature 2) proposes a method in which the start time and end time of the second language speech are adjusted to the first language speech, which makes it possible to synchronize between the speech and the image at the start and end times. However, the problem of local time lag between visual information and auditory information remains unsolved. In particular, in the case of translation of Japanese and English, the time lag due to the difference in the order of words is significant, and this may lead to misinterpretation.

For example, it is assumed that a speaker points (gesture 1) a can 1 (first spoken can) while speaking "Put this can into this can." in a first language (English), and then makes the motion to pointing (gesture 2) a can 2 (second spoken can). At this time, the temporal correspondence between the sound of the can 1 and the gesture 1, and the sound of the can 2 and the gesture 2 significantly contributes to the listener's understanding of the meaning. However, when it is translated into "Kono kan ni, kono kan wo irete kudasai." for a native speaker of a second language (Japanese), the order of the can 1 (first spoken can) and the can 2 (second spoken can) is reversed from the first language, so that the temporal correspondence is between the sound of the can 2 and the gesture 1, and the sound of the can 1 and the gesture 2. As a result, the meaning is reversed from what the speaker intended to say.

CITATION LIST

Patent Literature

Patent Literature 1: Japanese Unexamined Patent Application Publication No. 2004-230479
Patent Literature 2: Japanese Unexamined Patent Application Publication No. 2002-123282
Patent Literature 3: Japanese Unexamined Patent Application Publication No. Hei 6-253197

Nonpatent Literature

Nonpatent Literature 1: Tsunenori Ishioka, Masayuki Kameda, "JESS: AN AUTOMATED JAPANESE ESSAY SCORING SYSTEM", Journal of the Japanese Society of Computational Statistics, Vol. 16, No. 1, pp. 3-18 (2003)
Nonpatent Literature 2: R. E. Donovan and E. M. Eide, "The IBM Trainable Speech Synthesis System", Proc. ICSLP, Vol. 5, pp. 1703-1706, 1998
Nonpatent Literature 3: Keiichi Tokuda, "Application to Speech Synthesis based on Hidden Markov Models", Technical Research Report of the Institute of Electronics, Information and Communication Engineers, SP99-61, 47-54 (1999)

SUMMARY OF INVENTION

Technical Problem

The aim of the present invention is to eliminate the influence of the traditional automatic speech translation system on the understanding of the meaning due to translated second language speech, reproduced motion of a person who speaks a first language (speaker), and "time lag" in information that both sides have.

Solution to Problem

In order to solve the above problem, an aspect of the present invention is a method for synchronizing visual information and auditory information, including: extracting the visual information included in an image; recognizing the auditory information in a first language that is included in a speech in the first language; associating the visual information with the auditory information in the first language; translating the auditory information in the first language into visual information in a second language; and editing at least one of the visual information and the auditory information in the second language so as to associate the visual information with the auditory information in the second language.

A specific example is given for easy understanding, in which the visual information is, for example, gesture (pointing, motion) and facial expression, and the auditory information is, for example, speech content. The image is, for example, a video of the speaker that is captured by a camera.

Another aspect of the present invention is an information processing device that inputs input image data including first visual information as well as input speech data in a first language that includes the first visual information, and outputs output speech data including second visual information corresponding to the first visual information as well as output speech data in a second language that includes second auditory information corresponding to the first auditory information. This device includes: a detection unit for detecting the first visual information from the input image data; a recognition unit for recognizing the first auditory information from the input speech data; an association unit for associating the first visual information with the first auditory information; a translation unit for converting the input speech data in the first language into output speech data in the second language; and an optimization unit for controlling the output timing of at least one of the second visual information and the second auditory information so as to reduce the output timing difference between the second visual information and the second auditory information, both of which correspond to the first visual information and the first auditory information that are associated with each other.

The output visual data can be data that is finally recognized by the user's eyes, and may be video (for example, obtained by editing the input image data) or other data (for example, motion command data to specify the robot motion).

Still another aspect of the present invention is a device that automatically translates an input of speech in a first language into speech in a second language. In addition to the base configuration, the device includes: means for obtaining the body motion of the speaker, together with the input speech in the first language; means for detecting the correspondence between the obtained body motion and the input speech in the first language; means for detecting the correspondence between the speech in the second language, which is translated from the speech in the first language, and the obtained body motion of the speaker; means for reproducing the second language speech while reproducing the body motion of the speaker; means for evaluating the difference on the time axis between the second language and the reproduced body motion of the speaker; a plurality of means such as editing of the reproduced body motion of the speaker, editing of the translated second language text, and editing of the synthesized second language speech, with respect to the time axis; means for quantitatively evaluating the influence on the ease of understanding of the spoken context by editing of the reproduced body motion of the speaker, editing of the translated second language text, and editing of the synthesized second language speech; and means for selecting the most understandable means by using the evaluation means described above, after minimizing the time lag.

Advantageous Effects of Invention

According to the present invention, it is possible to reduce the "time lag" between the translated speech and the reproduced motion of the speaker and to achieve natural communication.

BRIEF DESCRIPTION OF DRAWINGS

FIG. 1B is a block diagram illustrating the overall configuration of the automatic speech translation device in remote image transfer according to the first embodiment.

DESCRIPTION OF EMBODIMENTS

Figure 1A:
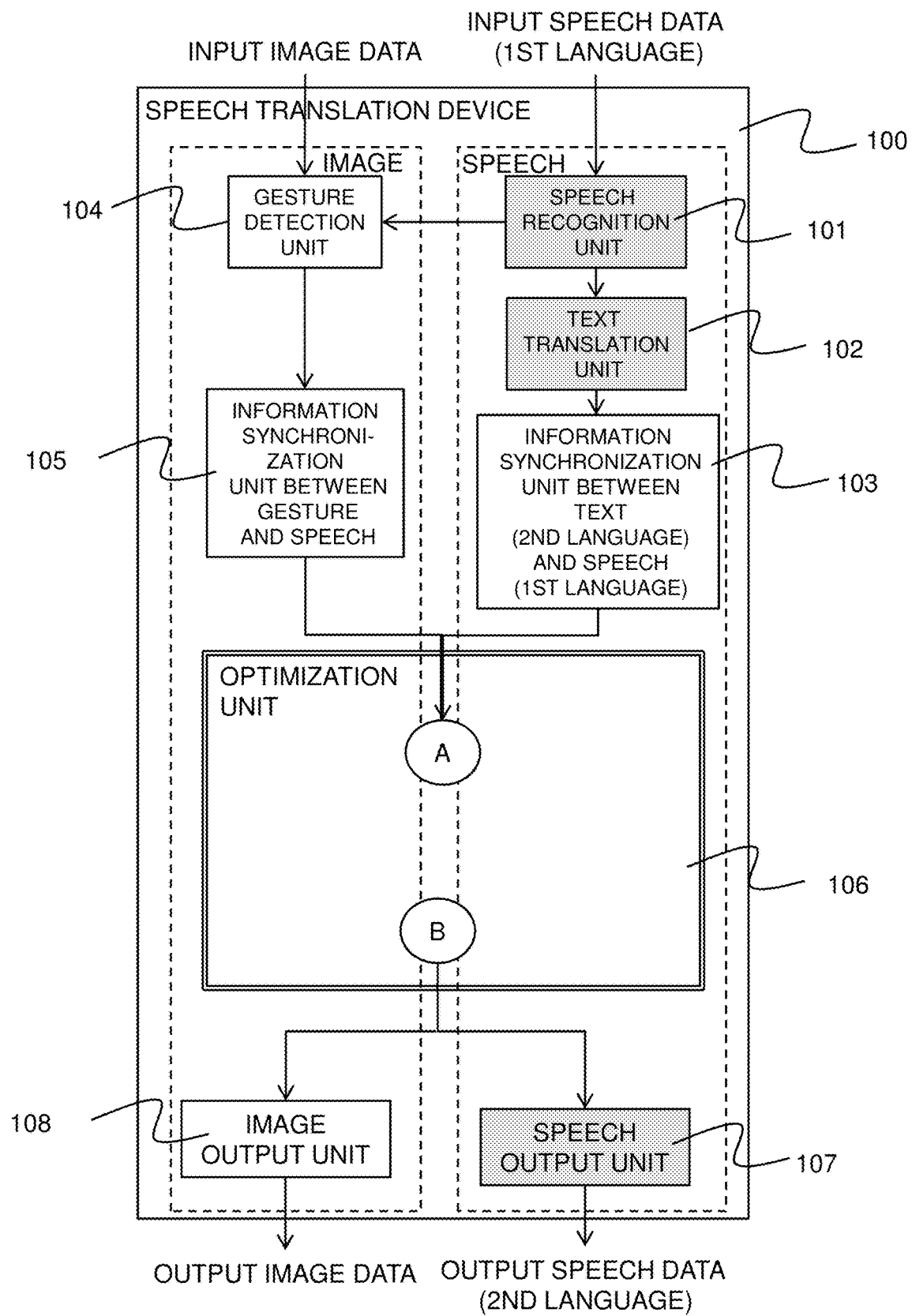
FIG. 1A is a block diagram illustrating the overall configuration of an automatic speech translation device in remote image transfer according to a first embodiment.

Hereinafter, preferred embodiments will be described with reference to the accompanying drawings. However, the present invention is not construed to be limited to the embodiments described below. Those skilled in the art can easily understand that the specific configuration can be modified without departing from the spirit or scope of the present invention.

In the configuration of the present invention described below, the same reference numerals are used in common for the same parts or parts having the same functions among different figures, and overlapping description may be omitted or simplified.

The expressions such as "first", "second", and "third" used in this specification or other applicable documents are intended to identify the components and do not necessarily limit the number or order of components. Further, a number for identifying a component is used for each context and the number used in one context does not necessarily represent the same configuration in other contexts. Further, the configuration identified by a certain number does not interfere with having the function of the component identified by another number.

The position, size, shape, range, and the like of each of the configurations shown in the figures or described herein may not represent the actual position, size, shape, range, and the like to facilitate the understanding of the invention. Thus, the present invention is not necessarily limited to the position, size, shape, range, and the like disclosed in the figures and the specification.

In the following embodiments, functions such as calculation and control are assumed to perform a given process in corporation with other hardware when a program stored in a storage device is executed by a processor. The means for achieving the program that the computer or other devices executes, or its function may be referred to as "unit", "function", "means", "part", "module" or the like. Further, in the embodiments, the function equivalent to the function configured in software can also be configured in hardware such as FPGA (Field Programmable Gate Array) and ASIC (Application Specific Integrated Circuit). Such aspects are also included in the scope of the present invention.

First Embodiment

The present embodiment will describe the basic configuration of the present invention under the assumption that the recorded (or remotely transferred) second language speech and the image data are converted into a second language speech and an image. For example, by assuming a remote class or teaching, the description assumes the case in which the image can be edited.

In the present embodiment, the basic functionality is achieved that convers a first language speech and image into a second language speech and image having the same meaning as the input by a speech translation device (system) of the present invention. In the following description, each unit of internal processing is called oo device, oo unit, or oo module. However, it is possible to implement it as a system that is implemented as software program or as a form of program, instead of implementing it as hardware.
<Outline>

FIG. 1A is a diagram illustrating the overall configuration of a speech translation device 100 according to the present embodiment.

Of the overall configuration shown in FIG. 1A, FIG. 1B is a detailed configuration of an optimization unit of information synchronization between image and speech (second language). A speech recognition unit 101, a text translation unit 102, a speech output unit 107, and a speech synthesis unit (second language) 1061, which are filled with grey color, are processing units that are also present in general speech translation systems. In particular, an optimization unit 106 of information synchronization between image and speech (second language) indicated by the double border will be described below in detail with reference to FIG. 1B.

When synchronized image data and speech data (first language) are input, the speech translation device 100 of this embodiment identifies the correspondence between gesture (pointing, and the like) extracted from the image, which is important for communication, and word (first language) spoken at the same timing. Then, the speech translation device 100 determines the most appropriate editing method (image editing, text editing, or speech editing) from the same translated text (second language), and minimizes the time lag between the gesture and the corresponding word (second language) while allowing naturalness and ease of understanding of image, text, and speech to be maintained as much as possible.

In order to achieve this speech translation process, the speech translation device 100 has the following processing units that general speech translation systems have: the speech recognition unit (first language) 101, the text translation unit (translating from first language to second language) 102, the speech synthesis unit (second language) 1061, and the speech output unit 107. In addition to these processing units, the speech translation device 100 also includes a gesture detection unit 104, an information synchronization unit 105 between gesture and speech (first language), an information synchronization unit 103 between text (second language) and speech (first language), an optimization unit 106 of information synchronization between image and speech (second language), and an image output unit 108.

Further, as detailed shown in FIG. 1B, the optimization unit 106 of information synchronization between image and speech (second language) includes: a time-lag evaluation module between second language speech and gesture 1062; an editing module 1064 for editing speech and image by each of the methods of image editing, text editing, and speech editing; a determination process 1063; and a speech/image naturalness evaluation module 1065 for evaluating the reduction in the naturalness of speech and image due to the editing module 1064. The speech/image naturalness evaluation module 1065 is based on criteria such as, for example, discontinuity after image editing, naturalness of text after changing the order of words, and naturalness of speech after changing the rate of speech.

Figure 1C:
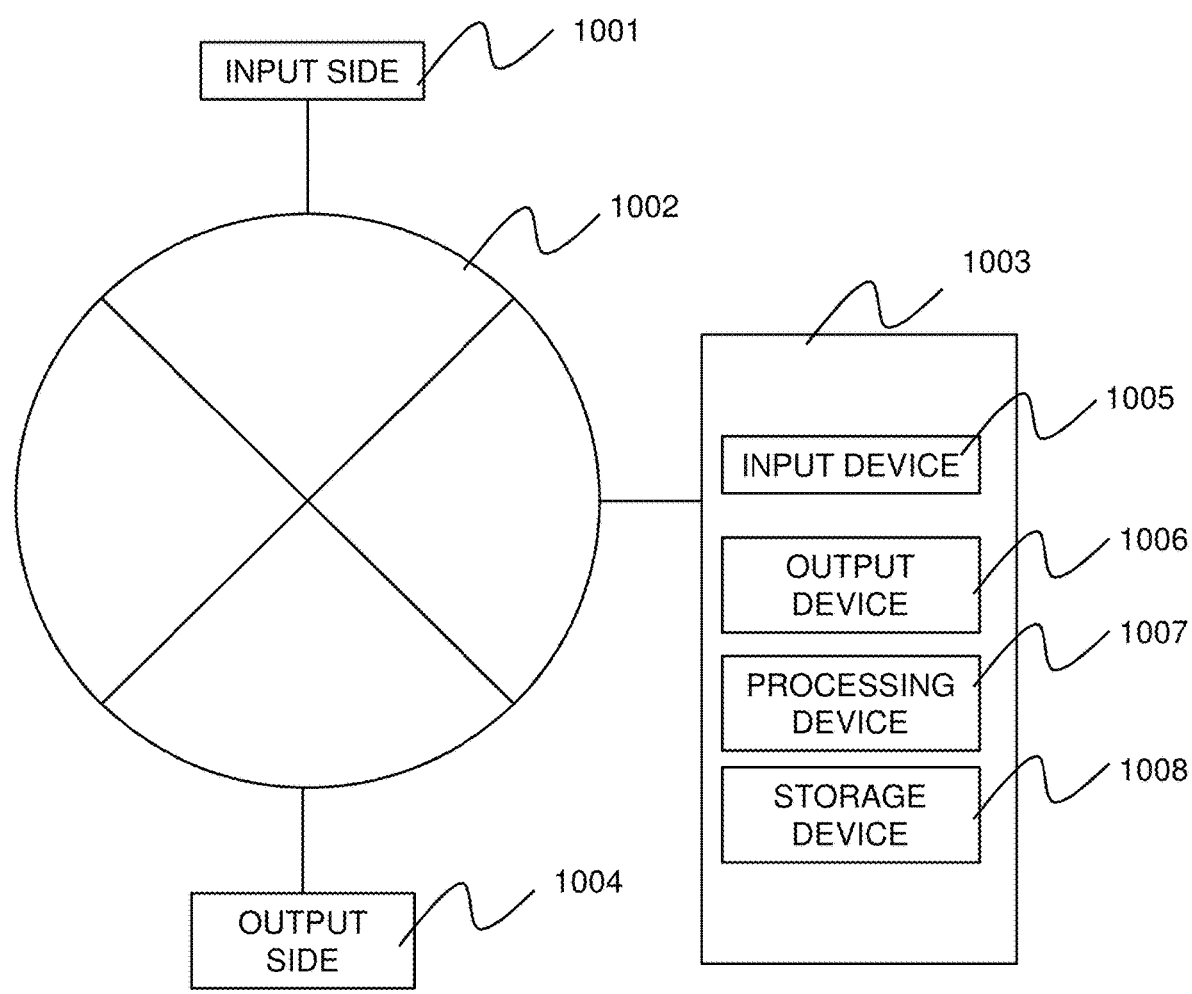
FIG. 1C is a block diagram illustrating the overall configuration of the automatic speech translation device in remote image transfer according to the first embodiment.

FIG. 1C is a system configuration example of this embodiment. Input image data and input speech data (first language) are input from an input-side terminal 1001. These input data are input to a server 1003 that configures the speech translation device 100, for example, through a network 1002. The server 1003 processes the input data, and transmits to an output-side terminal 1004 through the network 1002, as output image data and output speech data (second language).

The server 1003 includes, as general configuration, an input device 1005, an output device 1006, a processing device 1007, and a storage device 1008. The modules described in FIG. 1A and FIG. 1B can implement various functions when programs stored in the storage device 1008 are executed by the processing device 1007.
<Details>

Hereinafter, the processes performed by each of the processing units configuring this embodiment are first described with reference to FIG. 1. In the following description, the input speech is a single sentence such as "Kono kan ni, kono kan wo irete kudasai." (Japanese) or "Put this can into this can" (English). However, it is also possible to process a long speech in which a plurality of sentences are combined.

Further, the following description focuses on an example of translating speech from Japanese to English and from English to Japanese. However, it is also possible to translate between other languages. In this case, the internal processing (speech recognition, text translation, speech synthesis) should use program and data corresponding to each particular language.

Further, in the following description, "pointing" is described as an example but it can be expanded to all visual information that can be detected from an image. In particular, visual information that changes over time, such as hand and body gestures of the speaker and changing background, is considered to be important. Hereinafter, in the present invention, just describing gesture means all visual information.

Further, each of the processing units that configure this embodiment is described as automatic processing by a program. However, it is also possible to consider manual work by a worker in place of automatic program processing. For example, it is assumed that a gesture extraction unit allows extraction by hands of a worker.

The gesture detection unit 104 extracts visual information, which is important for communication, from the input image. It may be possible to perform a pattern recognition process on the input image. However, the importance of visual information is greatly affected by the content of the speech, so that a more accurate extraction is possible when extracting visual information by reference to the text obtained by speech recognition, rather than when extracting visual information only from the input image. The description exemplifies a remote class or teaching in which it is considered that the motion of "pointing" is important, so that extraction of the "pointing" motion is performed.

In an example, with respect to the input speech "Put this can into this can." (English), two pointing motions are detected from the image. The first motion (pointing 1) represents can 1 (corresponding to the can which is spoken first), and the second motion (pointing 2) represents can 2 (corresponding to the can which is subsequently spoken). Hereinafter, for ease of illustration, the first spoken can is expressed as can (1) which is assumed to correspond to kan 1 in the speech (text) in the second language, and the second spoken can is expressed as can (2) which is assumed to correspond to kan 2 in the speech (text) in the second language. Note that the numbers attached to the words, kan and can, are given to the specification and drawings for the purpose of illustration, and please keep in mind that the numbers that differentiate between kan and can are not actually spoken.

The information synchronization unit 105 between gesture and speech (first language) determines the correspondence between the gesture extracted by the gesture detection unit 104 and the corresponding word (first language).

Figure 2:
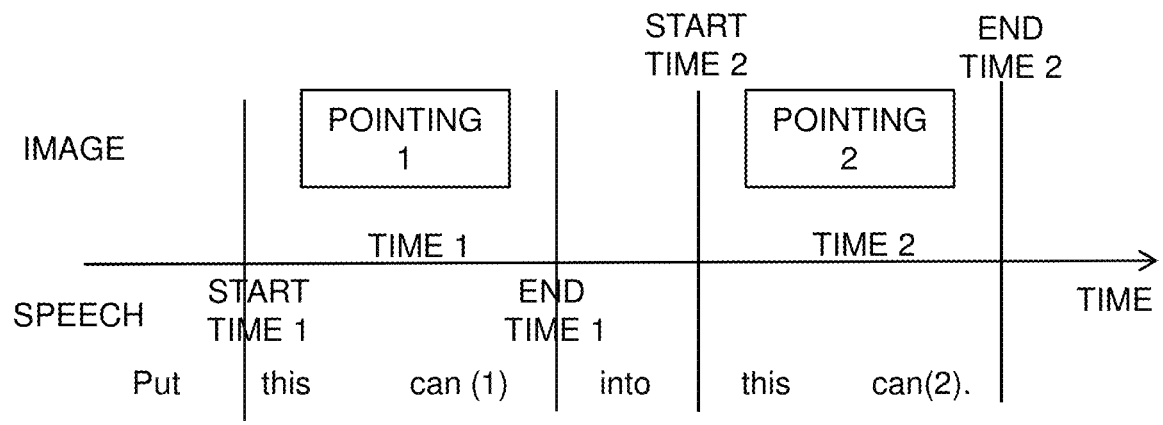
FIG. 2 is an image view showing the correspondence between gesture (pointing) extracted from an image and words (first language speech) obtained from a speech, which is obtained in an information synchronization unit between the gesture and the speech (first language).

An example is shown in FIG. 2. As shown in FIG. 2, the information synchronization unit 105 associates "pointing 1" that is extracted from the image with the text "can (1)" that is obtained from the speech. Then, the information synchronization unit 105 synchronizes the information with took place during "time 1" (from start time 1 to end time 1). Similarly, the information synchronization unit 105 associates "pointing 2" that is extracted from the image with the text "can (2)" that is obtained from the speech, and obtains the result that the action was performed during "time 2" (from start time 2 to end time 2).

The information synchronization unit 103 between text (second language) and speech (first language) synchronizes the information between the second language text and the first language speech, by using the correspondence information between the first language text obtained by the speech recognition unit 101 and the second language text obtained by the text translation unit 102. It is assumed that the speech recognition unit 101 and the text translation unit 102 use various known techniques, and thus detailed description thereof will be omitted.

Figure 3:
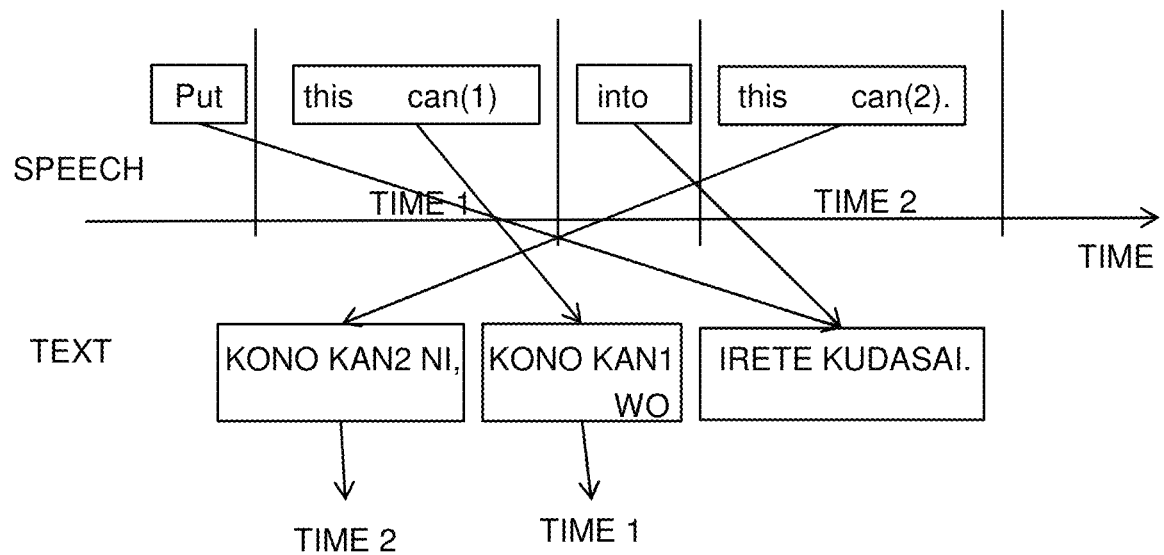
FIG. 3 is an image view showing the correspondence between the first language speech and the translated second language text, which is obtained in an information synchronization unit between the text (second language) and the speech (first language).

As shown in the example in FIG. 3, the information synchronization unit 103 can obtain the correspondence between English speech and Japanese text by using the correspondence between English "Put this can (1) into this can (2)." which is obtained from the input speech, and the Japanese text "Kono can 2 ni, kono can 1 wo irete kudasai." which is obtained by translating the English speech.

The optimization unit 106 of information synchronization between image and speech (second language) first generates a second language speech from the translated second language text by the speech synthesis unit (second language) 1061.

Figure 4:
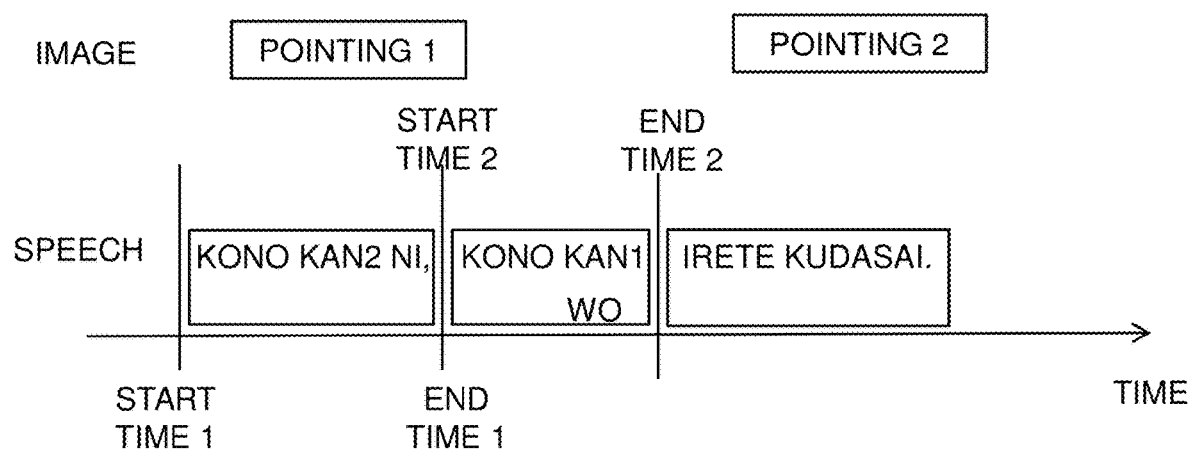
FIG. 4 is an image view of a second language speech synthesized by a speech synthesis unit (second language).

FIG. 4 shows an example of the speech synthesized by the speech synthesis unit (second language) 1061. Then, the time-lag evaluation module between second language speech and gesture 1062 evaluates the time lag between the gesture of the image and the second language word in the speech corresponding to the gesture, when the text is synthesized with the second language speech by using the correspondence between the gesture, which is input from the information synchronization unit 105 between gesture and speech (first language), and the first language speech, and by using the correspondence between the second language text, which is input from the information synchronization unit 103 between text (second language) and speech (first language), and the first language speech, which is hereinafter simply referred to as the "time lag".

It is assumed that the time lag can be evaluated from the difference between the start/end time of the gesture and the start/end time of the corresponding second language speech. If all time lags are equal to or less than a certain threshold, the time-lag evaluation module 1062 outputs the evaluation results to the image output unit 108 and the speech output unit 107. However, if any of the time lags exceeds the threshold, the time-lag evaluation module 1062 outputs the evaluation results to the editing module 1064.

An example of the evaluation method is as follows:

Time lag 1=|start time 1 (gesture 1)−start time 2 (second language speech)|+|end time 1 (gesture 1)−end time 2 (second language speech)|

Time lag 2=|start time 2 (gesture 2)−start time 1 (second language speech)|+|start time 2 (gesture 2)−start time 1 (second language speech)|

The mark "|*|" means the absolute value of *. Here, when the start time 1, end time 1, start time 2, and end time 2 of the gesture are respectively 100 ms, 300 ms, 400 ms, and 600 ms, and when the start time 1, end time 1, start time 2, and end time 2 of the second language are respectively 0 ms, 200 ms, 200 ms, and 400 ms, the following equations are obtained:

Time lag 1=|100 ms−200 ms|+|300 ms−400 ms|=200 ms

Time lag 2=|400 ms−0 ms|+|600 ms−200 ms|=800 ms

When the predetermined threshold of the "time lag" is 50 ms, both the "time lag" (=200 ms) of the gesture 1 and the "time lag" (=800 ms) of the gesture 2, both of which are calculated by the above equation, are greater than the threshold. Thus, the time-lag evaluation module 106 determines that it is necessary to edit them, and outputs to the editing module 1064.

The editing module 1064 can edit (or control the timing of) the second language speech and the input image by using at least one of the methods of editing with a plurality of modules, such as an image editing module 1064a, a text editing module 1064b, and a speech editing module 1064c.

The image editing module 1064a allows acceleration and slowing down of the image, and changing the order of the scenes. Here, image editing can use all kinds of image editing techniques such as temporarily holding image, changing the reproduction order of video, and reproduction by CG using computer graphics (CG).

The text editing module 1064*b* may allow change in the order of words as well as conversion of a certain word into a synonym with different length. Here, text editing can use all kinds of techniques for changing text.

The editing module 1064*a* may allow partial acceleration and slowing down of the image, or inserting a pause. Here, speech editing can use all kinds of speech synthesis techniques for changing speech. Here, it is possible to use the speech synthesis unite (second language) 1061 as the speech editing module 1064*c*. In other words, it is possible to prevent the degradation of naturalness due to speech editing, by resynthesizing the speech, not because of editing the synthesized speech.

As described above, by using the editing functions, the editing module 1064 edits the image and speech so as to further reduce the time lag between the second language speech and the gesture.

Figure 5:
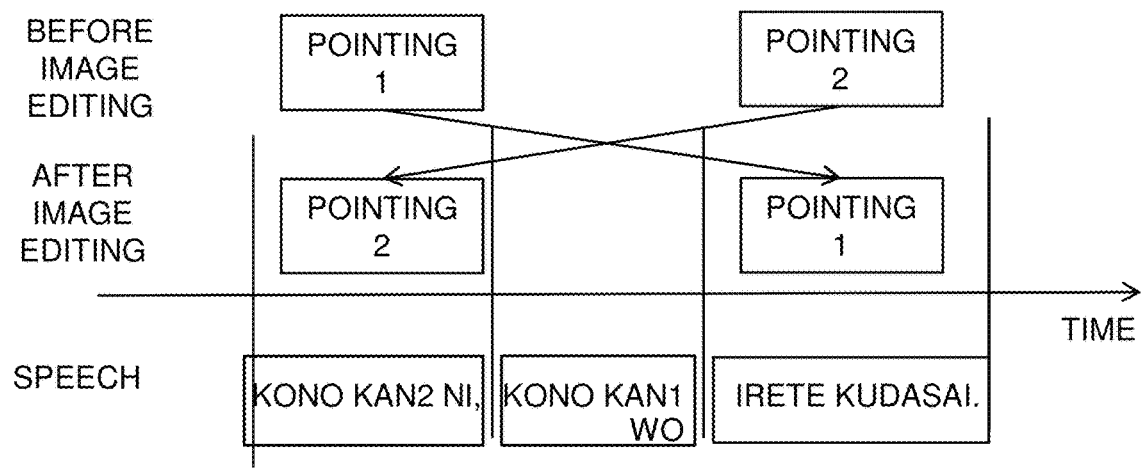
FIG. 5 is an image view showing an example of eliminating the "time lag" due to image editing.

FIG. 5 is an example of editing the image by the image editing module 1064*a*. It is possible to reduce the time lag between the image and the speech by reversing the image of the part of the gesture 1 (pointing 1) and the image of the part of the gesture 2 (pointing 2).

Figure 6:
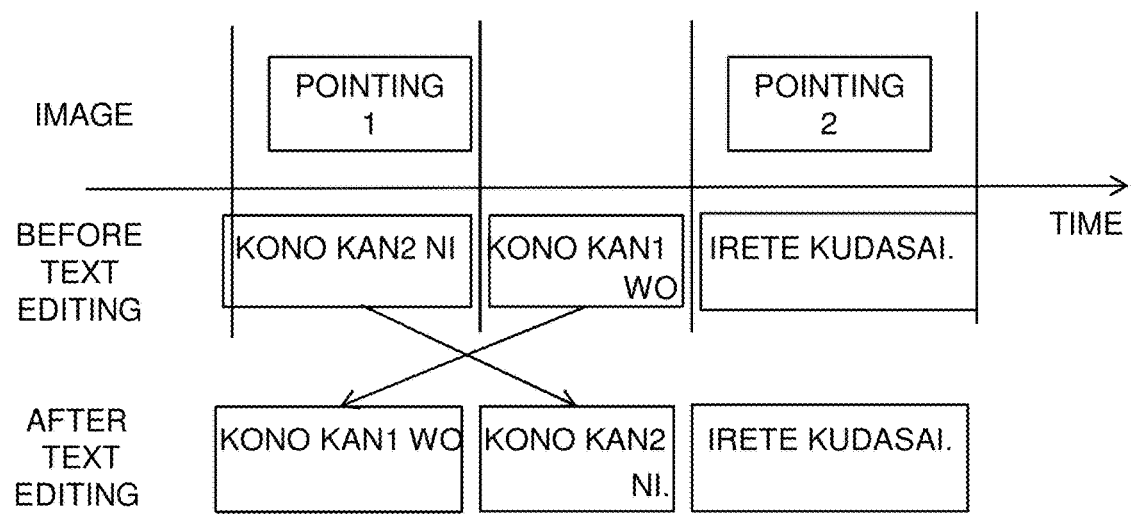
FIG. 6 is an image view showing an example of eliminating the "time lag" due to text editing.

FIG. 6 is an example of editing text by the text editing module 1064*b*. Text editing can reduce the time lag from the image by changing the order of the words "Kono kan 2 ni kono kan 1 wo irete kudasai." into "Kono kan 1 ni kono kan 2 wo irete kudasai." Such text editing can be achieved by changing the candidate of the translation result in the text translation unit 102. In other words, machine translation can present a plurality of candidates as translation results, so that it is possible to select a candidate with the smallest time lag between the image and the speech based on the text, from among the candidates. Or as another method, there is a method for converting to a text with the same meaning on a text basis. As a specific example, there is a method for converting the order of words in the text by an operation such as reversing the object.

Figure 7:
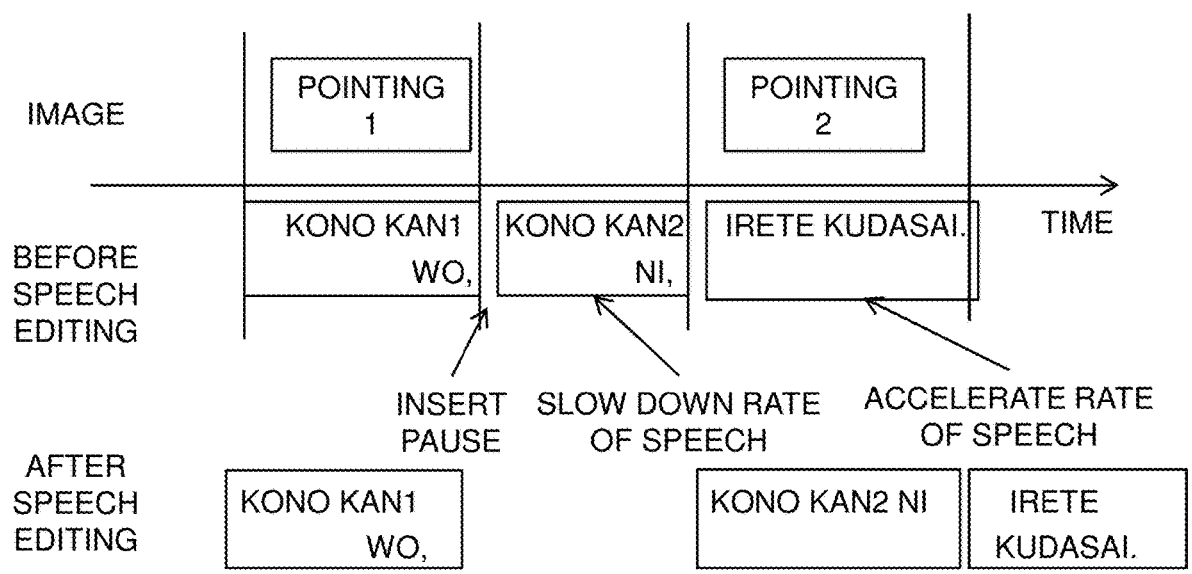
FIG. 7 is an image view showing an example of eliminating the "time lag" due to speech editing.

FIG. 7 is an example of editing the speech by the speech editing module 1064*c*. As shown in FIG. 7, it is possible to further reduce the time lag between the speech and the pointing of the image by accelerating and slowing down the speech and by inserting a pause, after text editing shown in FIG. 6.

Each of the modules can be used in combination or alone. Note that each module can be configured to adjust the rate of output speech so that the whole length of the input speech (first language) and the whole length of the output speech (second language) are approximately equal before the process by the optimization unit, and then perform editing within this time range.

The speech/image naturalness evaluation module 1065 evaluates the naturalness for each of a plurality of time lag elimination methods (image editing, text editing, speech editing, and the like), and selects the method with high naturalness.

With respect to the naturalness evaluation of the edited image, as described in Patent Literature 3, it is possible to evaluate the naturalness of the image by evaluating the spatio-temporal continuity of the edited image as well as the smoothness of spatio-temporal variation in the edited image.

The naturalness evaluation of the edited text evaluates the naturalness from several viewpoints such as grammar, written style, and written style. For example, it may be consider an automated Japanese essay scoring system proposed in Non-Patent Literature 1.

The naturalness evaluation of the edited text can allow an objective evaluation by using the continuity of the spectrum of the speech, as well as the generation probability calculation by a statistical model such as Hidden Markov Model (HMM). For example, discontinuity due to text editing can be evaluated by using the amount of change in speech parameter (Non-Patent Literature 2). On the other hand, with respect to speech distortion due to speech editing such as prosody modification, it may be possible to consider a method for evaluating the naturalness by calculating the probability of generating the edited text by using HMM (Non-Patent Literature 3) that expresses the process of speech generation by the probability. As described above, the method for evaluating the naturalness can use various well-known techniques and there is no particular limitation.

In an example, the text editing method is selected because it is evaluated that the naturalness is higher in changing the word order after text editing than in image editing. However, in the case of only performing text editing, although the time lag from the gesture 1 is eliminated, speech editing (pause insertion and speech rate adjustment) is required to make the time lag from the gesture 2 being smaller than the threshold.

Thus, in an example, when performing speech editing (FIG. 7) after editing the text (FIG. 6), speech and image with higher naturalness can be obtained and output to the image output unit 108 and the speech output unit 109. The image output unit 108 outputs the image generated by the optimization unit 106 of information synchronization between image and speech (second language). The speech output unit 107 outputs the speech generated by the optimization unit 106 of information synchronization between image and speech (second language).

As described above, the editing methods with excellent naturalness are selected and combined. As for selection criteria, there are method of placing emphasis on the naturalness of the image, method of placing emphasis on the naturalness of the speech, and method of balancing the both, and an arbitrary method can be set depending on the intended use and situation.

Note that, as shown in the configuration in FIG. 1B, the optimization unit 106 is configured such that the speech synthesis unit 1061 performs speech synthesis again on the result of editing by the editing module 1064, and that the time-lag evaluation module 1062 performs re-evaluation, which is recursively operated until the time lag is less than the threshold to output data obtained by the editing method in which the time lag is less than the threshold. However, it may be possible to eliminate the re-evaluation performed by the time lag evaluation module 1062 if the optimization unit 106 is designed to be able to eliminate the time lag at one time by the editing module in a fully effective manner.

The configuration of the embodiment described above can be configured with a single computer as shown in FIG. 1, or can be configured with another computer to which an arbitrary part of the input device, the output device, the processing device, and the storage device is connected through a network or the like. Both approaches are equivalent in terms of the spirit of the invention and there is no difference between them.

Second Embodiment

This embodiment describes the basic configuration of the present invention, under the assumption that the speech translation is performed through a robot. In other words, the configuration compliments the speech by the motion of a robot, in place of image output in the first configuration. In this embodiment, when the speech and image of a first language speaker is input to a speech translation device (robot) of the present invention, the robot translates the first language speech into a second language speech while achieving the basic functionality to reproduce the motion of the speaker.

<Outline>

Figure 8A:
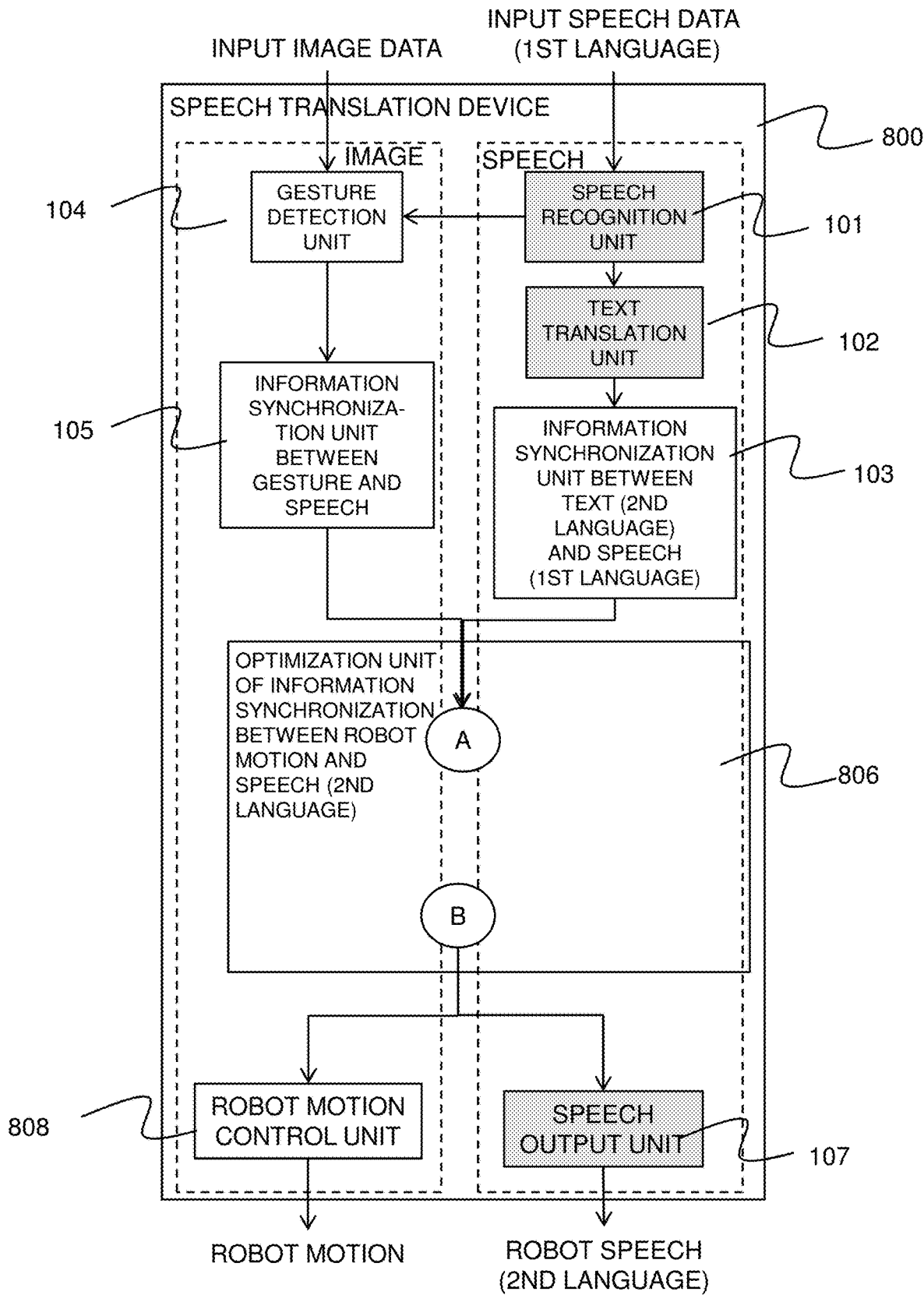
FIG. 8A is a block diagram illustrating the overall configuration of an automatic speech translation device in a robot according to a second embodiment.

FIG. 8A is a diagram illustrating the overall configuration of a speech translation device of this embodiment.

Figure 8B:
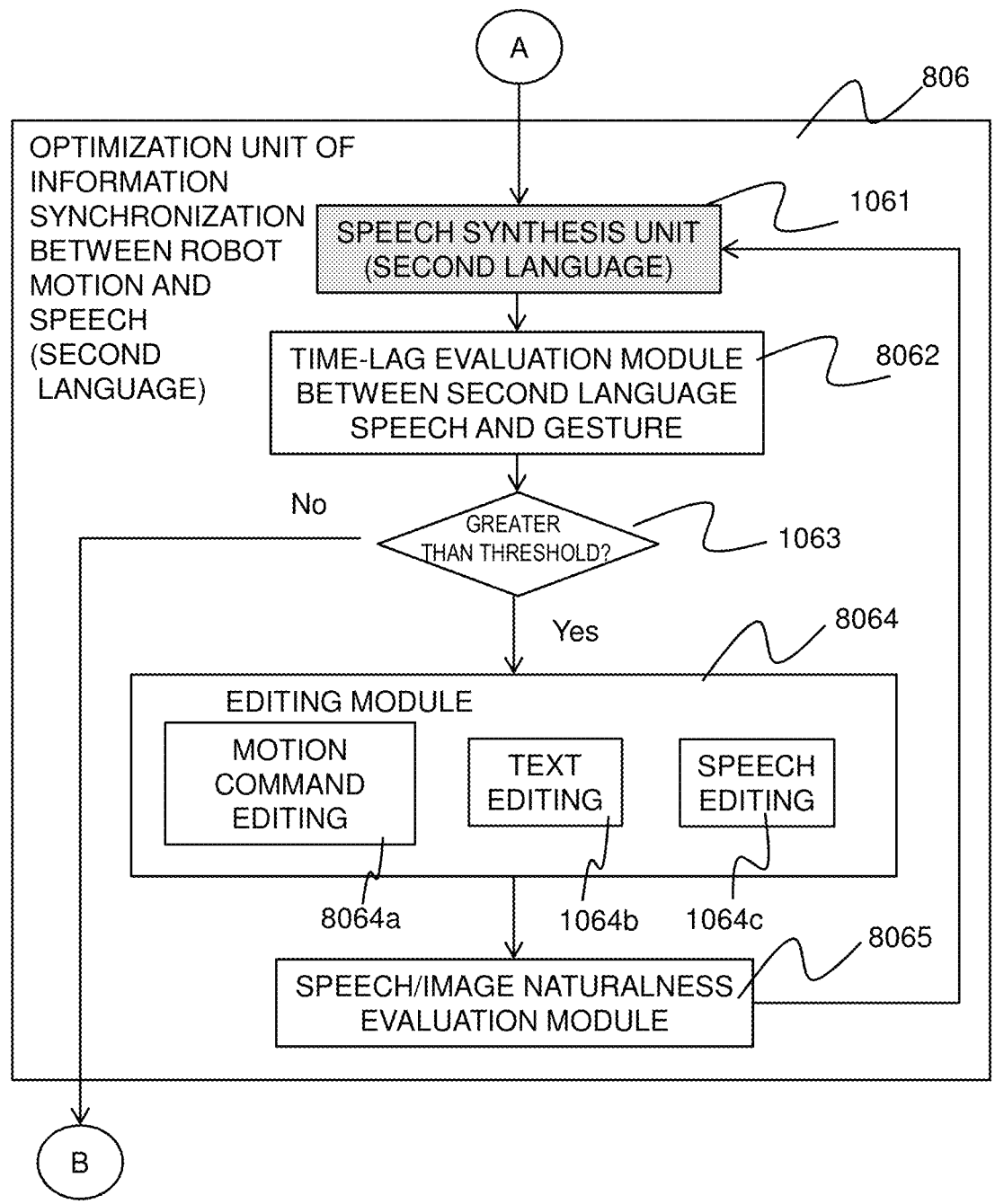
FIG. 8B is a block diagram illustrating the overall configuration of the automatic speech translation device in the robot according to the second embodiment.

FIG. 8B shows the detailed configuration of an optimization unit of information synchronization between image and speech (second language) 806 of the overall configuration in FIG. 8A. The same configurations as those in FIG. 1A and FIG. 1B are designated by the same reference numerals and the description thereof will be omitted.

When synchronized image data and speech data (first language) are input, a speech translation device 800 of this embodiment identifies the correspondence between a gesture (pointing, and the like) extracted from the image, which is important for communication, and a word (first language) spoken at the same timing. Then, the speech translation device 800 determines the most appropriate editing method (robot motion command editing, text editing, speech editing, or the like), and minimizes the time lag between the reproduced gesture of the robot and the corresponding word (second language), while allowing the naturalness and ease of understanding of the robot motion, the text, and the synthesized speech to be maintained as much as possible.

In order to achieve this speech translation process, the characteristic configuration of the second embodiment compared to the configuration of the first embodiment is that the speech translation device 800 includes the optimization unit of information synchronization between robot motion and speech (second language) 806, and a robot motion control unit 808. The optimization unit of information synchronization between robot motion and speech (second language) 806 includes an editing module 8064 in place of the editing module 1064 of the first embodiment, as well as a time-lag evaluation module 8062 between the second language speech and the gesture (of the robot) in place of the time-lag evaluation module 1062 between the second language speech and the gesture (of the image).

The editing module 8064 includes a motion editing module 8064a that edits the motion of the robot, in place of the image editing module 1064a. The evaluation of reduction in the naturalness of the speech/robot motion due to the editing module 8064 is performed by a speech/motion naturalness evaluation module 8065.

As for the description of the process of this embodiment, only the difference from the first embodiment is described. The description of the same processing units as in the first embodiment will be omitted.

In the second embodiment, it is possible to change the motion of the robot by editing the motion command for controlling the motion of the robot, in place of the image editing of the first embodiment. (Hereinafter, "motion command editing" and "robot motion editing" are the same meaning.)

In the optimization unit of information synchronization between robot motion and speech (second language) 806, it is possible to evaluate the time lag between the second language speech by speech synchronization and the robot body motion (gesture) according to the robot motion command, by the time-lag evaluation module between second language speech and gesture 8062.

Figure 9:
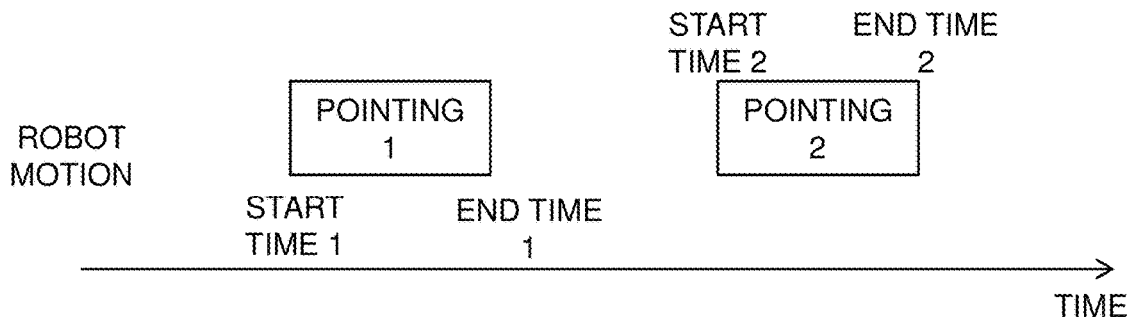
FIG. 9 is an image view showing the timing of the estimated motion of the robot.

FIG. 9 shows a sequence of the robot motion command. Such a robot motion command is, for example, a technique that controls a robot to perform motion corresponding to human motion, which has been well known in robotics. The second embodiment assumes, for example, an application in which the robot on the reception side copies human motion on the transmission side, while translating human speech (first language) on the transmission side and outputting the result on the reception side.

Figure 10:
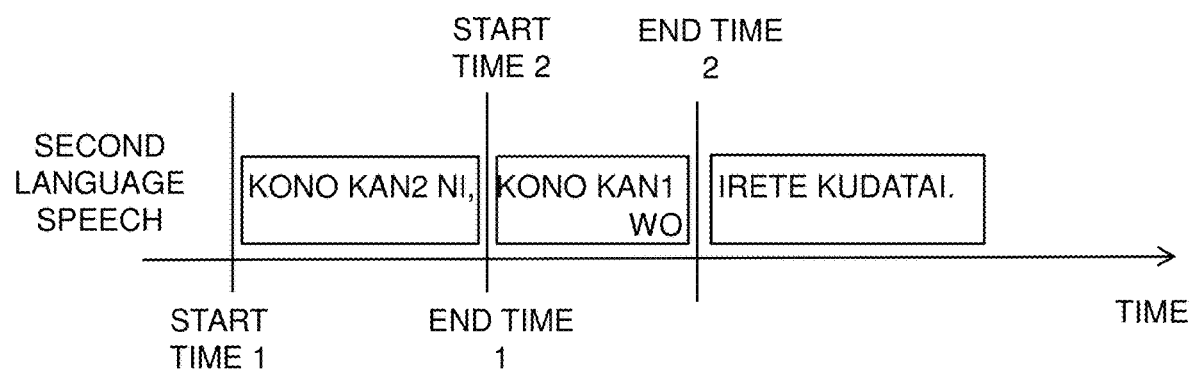
FIG. 10 is an image view showing the timing of the synthesized second language speech.

FIG. 10 shows the timing of the second language speech. In this example, when it is estimated that the second language synthesized speech and the motion of pointing according to the robot motion command are respectively performed at the timing shown in FIG. 9 and at the timing shown in FIG. 10, the "time lag" can be calculated in the same manner as in the first embodiment.

Time lag 1=|start time 1 (gesture 1)−start time 2 (second language speech)|+|end time 1 (gesture 1)−end time 2 (second language speech)|

Time lag 2=|start time 2 (gesture 2)−start time 1 (second language speech)|+|start time 2 (gesture 2)−start time 1 (second language speech)|

The mark "*" means the absolute value of *. Here, when the start time 1, end time 1, start time 2, and end time 2 of the gesture are respectively 100 ms, 300 ms, 400 ms, and 600 ms, and when the start time 1, end time 1, start time 2, and end time 2 of the second language are respectively 0 ms, 200 ms, 200 ms, and 400 ms, the following equations are obtained:

Time lag 1=|100 ms−200 ms|+|300 ms−400 ms|=200 ms

Time lag 2=|400 ms−0 ms|+|600 ms−200 ms|=800 ms

When the predetermined threshold of "time lag" is 50 ms similarly to the first embodiment, both the "time lag" (200 ms) of gesture 1 and the "time lag" (800 ms) of gesture 2, which are calculated with the above respective equations, are greater than the threshold. Thus, it is determined that editing is required, and the data is output to the editing module 8064.

In the editing module 8064, unlike text editing in the first embodiment, the operation command editing module 8064a includes the function for editing the robot motion according to the motion command editing. Here, methods such as a text editing module 8064b and a speech editing module 8064c are the same as those in the first embodiment, and the description thereof will be omitted.

The motion command editing module 8064a may allow acceleration and slowing down of the image, and changing the order of the motions. With this configuration, the motion command editing module 8064a edits the robot motion to further reduce the time lag between the second language speech and the gesture of the robot.

Figure 11:
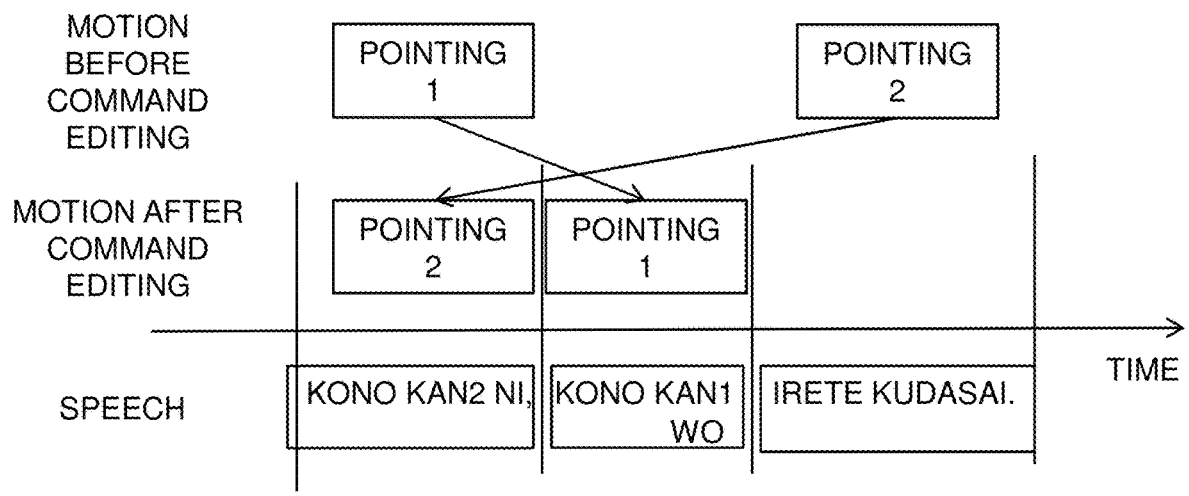
FIG. 11 is an image view for eliminating the "time lag" due to operation command editing.

FIG. 11 is a view showing an example of editing the robot motion command. In this example, it is possible to reduce the "time lag" from the speech content in such a way that the motion of gesture 1 of the robot and the motion of gesture 2 of the robot are replaced with each other.

Further, as shown in FIG. 6 in the first embodiment, it is possible to reduce the time lag from the robot motion by changing the order of words by text editing. Further, as shown in FIG. 7, it is possible to reduce the time lag from the robot motion by accelerating and slowing down the speech, or by inserting a pause. In the second embodiment, the "image" in FIG. 6 and FIG. 7 can be replaced with the "robot motion".

The speech/motion naturalness evaluation module 8065 evaluates the naturalness for each of a plurality of methods (motion command editing, text editing, speech editing, and the like) that eliminate the "time lag. Then, the speech/motion naturalness evaluation module 8065 selects the method with the highest naturalness. In an example, as shown in FIG. 11, when it is evaluated that the naturalness is higher in editing of the robot motion command than in performing speech editing and text editing, the speech/motion naturalness evaluation module 8065 performs the robot motion command editing and outputs to the robot motion control unit 808 and the speech output unit 107.

However, there is a possibility that the motion may not be obtained at a desired timing even after the motion command editing due to the limitations of the robot itself (rate of motion, and the like).

Figure 12:
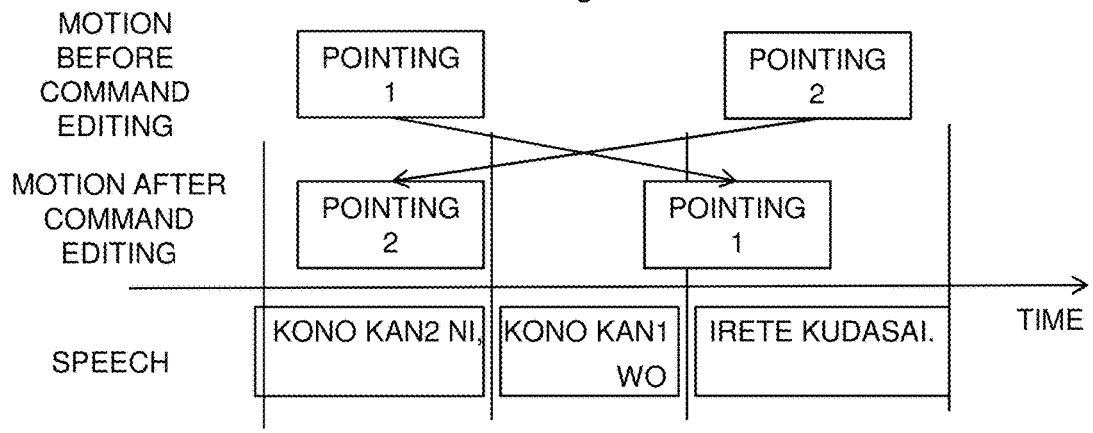
FIG. 12 is an image view showing the timing of the motion of the robot when it is not able to move on targeted time due to limitations of robot motion.

FIG. 12 shows the example. As it is difficult to accelerate the timing of the pointing 1, a time lag occurs from the speech. When the robot can move only at the timing shown in FIG. 12, it is difficult to reduce the "time lag" to a level less than the threshold only by editing the motion command.

Figure 13:
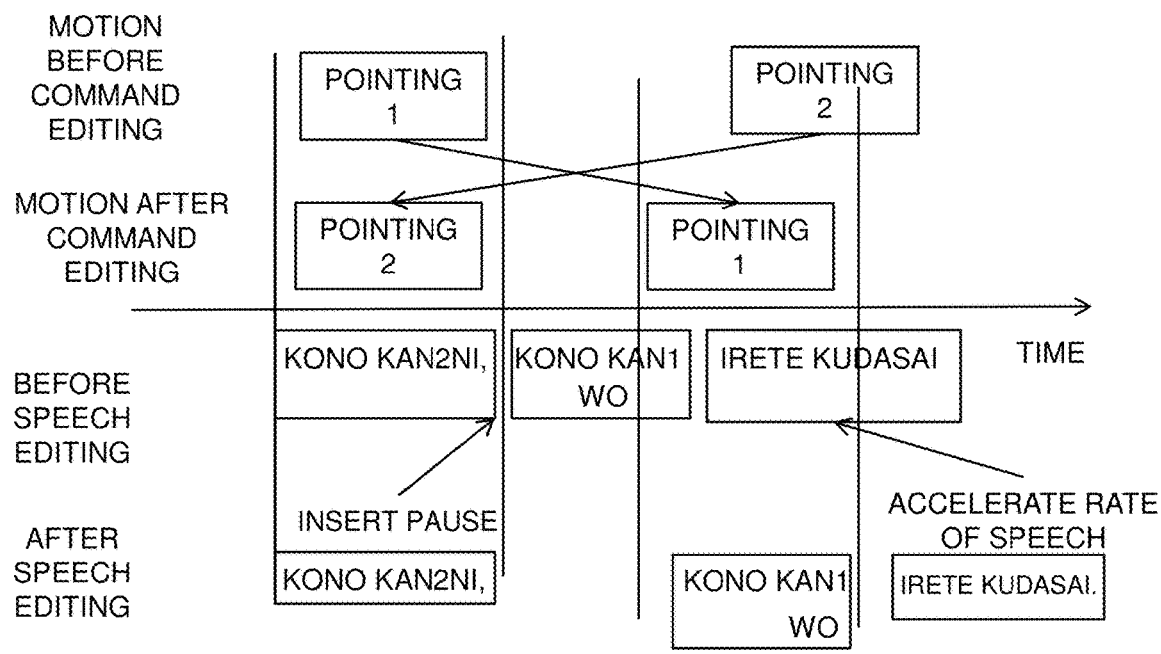
FIG. 13 is an image view when eliminating the "time lag" caused by performing operation command editing and speech editing at the same time.

FIG. 13 shows an example of performing speech editing, in addition to motion command editing by the process shown in FIG. 12. In the example in FIG. 13, a pause is inserted to slow down "kono kan 1 wo" in the speech, and at the same time, the part of "irete kudasai." is spoken fast to limit the whole time within a predetermined time range.

Third Embodiment

This embodiment describes the basic configuration of the present invention, under the assumption that speech translation is performed through a mobile terminal (mobile phone, tablet, or the like).

This embodiment achieves the basic functionality for converting first language speech and image into second language speech and image having the same meaning as the input, by using a speech translation device (system) according to the present invention. In the following description, each unit of internal processing is called oo device. However, it is possible to implement it as a system that is implemented as software program or as a form of program, instead of implementing it by a device as hardware.
<Outline>

Figure 14:
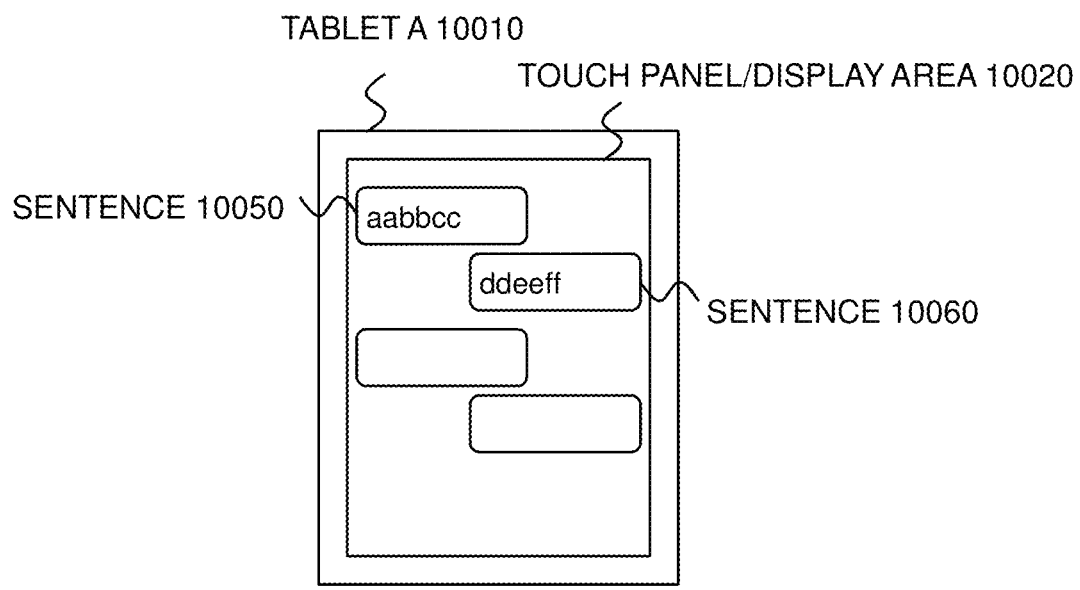
FIG. 14 is a plan view showing the characteristics of an automatic speech translation device in a mobile terminal according to a third embodiment.
Figure 14:
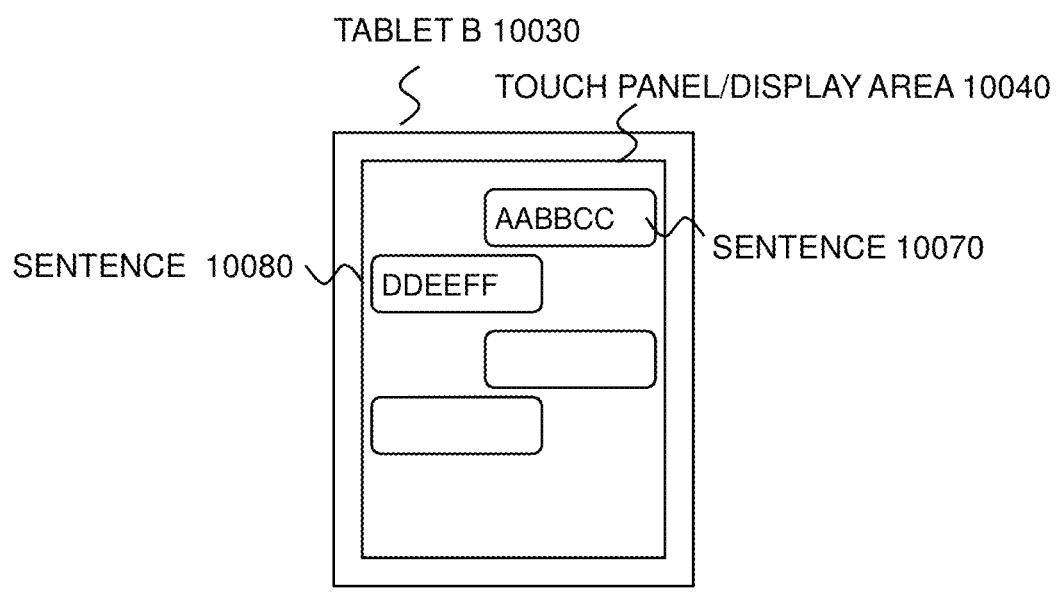

FIG. 14 is a view showing the use form of the third embodiment. Here, it is assumed that there are two speakers (speaker A and speaker B) and they are speaking in different languages. It is assumed that the languages the respective speakers are speaking are language A and language B.

The speaker A has a tablet A 10010. The speech spoken by the speaker A in language A is speech-recognized and displayed in a display area 10020 of the tablet (sentence 10050, "aabbcc", on the tablet A). The result of translating the word into language B that the speaker B can understand is displayed in a display area 10040 of a tablet B 10030 that the speaker B has (sentence 10070, "AABBCC", on the tablet B).

On the other hand, the speech spoken by the speaker B in language B is speech-recognized and displayed on the tablet B 10030 (sentence 10080, "DDEEFF", on the tablet B). This word is translated to language A and displayed in the tablet A 10010 that the speaker A has (sentence 10060, "ddeeff", on the tablet A).

Here, it is assumed that the speaker A cancels a word that has been spoken. Various methods can be considered for specifying cancellation. For example, the speaker A sweeps the cancellation part of the display area 10020 on the tablet A. Here, when the speaker A sweeps the sentence 10050 "aabbcc" on the tablet A, the sentence 10070 on the tablet B also has a sign indicating that the particular word has been cancelled. For example, it is considered that the x mark is displayed or the word itself is deleted.

Further, it could also be a case of wanting to cancel only some words in one sentence. At this time, for example, the speaker A sweeps the cancellation part of the display area 10020 on the tablet A. Here, the speaker A sweeps only "bb" of the sentence 10050 "aabbcc" on the tablet A. Then, a sign indicating that the particular words have been cancelled is displayed also on the corresponding display "BB" of the sentence 10070 on the tablet B. For example, actions such as displaying the X mark on "BB" or deleting "BB" may take place.

The above process can be performed by the tablet. However, when the tablets A and B are connected by a network, for example, the tablet A can be associated with the input-side terminal 1001 and the tablet B can be associated with the output-side terminal in the configuration in FIG. 1C. In this case, some or all of the processes, such as speech recognition, translation, and control of information displayed on the tablet, can be performed by the server 1003. In this case, for example, the specification of the part cancelled by the tablet A is transmitted to the tablet B through the server 1003. Then, the display on the tablet B is cancelled by control of software such as a browser running on the tablet B.

As described above, according to the embodiment described in FIG. 14, it is possible to achieve a smooth communication when the server or tablet performs:

a step of inputting a first speech in a first language into a terminal A;

a step of displaying the first speech to the terminal A (by speech recognition, or the like) as a first text;

a step of transferring the first text from the terminal A to a terminal B (through a network, or the like);

a step of displaying the first text on the terminal B as a second text in a second language (by machine translation or other translation techniques) (note that machine translation can be performed by the server within the network or by the terminal A or B);

a step of specifying an arbitrary part of the first text displayed on the terminal A;

a step of notifying the terminal B from the terminal A about the specification of the arbitrary part; and a step of changing the display of the part corresponding to the specified arbitrary part of the first text, in the second text displayed on the terminal B.

It should be noted that the present invention is not limited to the above exemplary embodiments and includes various variations. For example, part of the configuration of an embodiment can be replaced with the configuration of another embodiment, and the configuration of an embodiment can be added to the configuration of another embodiment. Further, the addition, deletion, and substitution of the configuration of another embodiment can be made for parts of the configuration of each embodiment.

INDUSTRIAL APPLICABILITY

The present invention can be used in communication tools such as for automatic translation.

REFERENCE SIGNS LIST

Speech translation device 100, Speech recognition unit 101, Text translation unit 102, Information synchronization unit 103 between text (second language) and speech (first language), Gesture detection unit 104, Information synchronization unit 105 between gesture and speech (first language), Speech synthesis unit (second language) 1061, Optimization unit 106 of information synchronization between image and speech (second language), Speech output unit 107, Image output unit 108

The invention claimed is:

1. A method for synchronizing visual information and first auditory information, comprising:
    extracting the visual information included in an image, the visual information including a first gesture and a second gesture occurring after the first gesture;
    recognizing first auditory information in a first language that is included in a speech in the first language;
    associating the visual information with the first auditory information in the first language;
    translating the first auditory information in the first language into second auditory information of a second language; and
    editing the visual information and the second auditory information in the second language so as to associate the visual information with the second auditory information in the second language,
    wherein the editing of the visual information includes editing the visual information so that the second gesture occurs before the first gesture.

2. The method for synchronizing visual information and first auditory information according to claim 1,
    wherein editing to associate the visual information with the second auditory information in the second language includes editing to evaluate a time lag between the visual information and the second auditory information in the second language to reduce the particular time lag.

3. The method for synchronizing visual information and first auditory information according to claim 1,
    wherein an editing method that edits at least one of the visual information and the second auditory information in the second language selects one or more of the most appropriate editing methods from a plurality of editing methods.

4. The method for synchronizing visual information and first auditory information according to claim 3,
    wherein a method for selecting the most appropriate methods uses results of evaluating the reduction in the naturalness of the visual information and of the second auditory information in the second language due to each of the editing methods.

5. The method for synchronizing visual information and first auditory information according to claim 4,
    wherein the evaluation of reduction in the naturalness of the visual information evaluates the naturalness by using at least one of the factors of continuity of the image, naturalness of the image, and continuity of robot motion corresponding to the image.

6. The method for synchronizing visual information and first auditory information according to claim 4,
    wherein the evaluation of reduction in the naturalness of the second auditory information in the second language evaluates the naturalness by using at least one of the factors of continuity of a speech in the second language that includes the second auditory information in the second language, naturalness of the second language speech, consistency in the meaning of the speech in the second language and the speech in the first language, and ease in understanding the meaning of the speech in the second language.

7. The method for synchronizing visual information and first auditory information according to claim 3,
    wherein the method for selecting the most appropriate methods selects an editing method with less reduction in the naturalness of the visual information and of the second auditory information in the second language due to editing of the visual information and editing of the second auditory information in the second language.

8. The method for synchronizing visual information and first auditory information according to claim 3,
    wherein the editing method for editing the visual information changes the timing of the visual information by using at least one of the methods of temporarily stopping reproduction of the image, editing using CG of the image, changing the rate of robot motion corresponding to the image, and changing the order of robot motions corresponding to the image.

9. The method for synchronizing visual information and first auditory information according to claim 3,
    wherein the editing method for editing the second auditory information in the second language changes the timing of the second auditory information by using at least one of the methods of temporarily stopping reproduction of the speech in the second language that includes the second auditory information in the second language, changing the reproduction order of the speech in the second language, changing the order of spoken words of the speech in the second language, and changing the speech content of the speech in the second language.

10. An information processing device, comprising:
    a memory coupled to a processor, the memory storing instructions that when executed by the processor, configure the processor to:
    input input image data including first visual information as well as input speech data in a first language that includes first auditory information, the first visual information including a first gesture and a second gesture occurring after the first gesture,
    output output visual data including second visual information corresponding to the first visual information, as well as output speech data in a second language that includes second auditory information corresponding to the first auditory information,
    detect the first visual information from the input image data,
    recognize the first auditory information from the input speech data,
    associate the first visual information with the first auditory information,
    convert the input speech data in the first language into the output speech data in the second language, and
    control the output timing of the second visual information and the second auditory information so as to reduce the output timing difference between the second visual information and the second auditory information, both of which correspond to the first visual information and the first auditory information that are associated with each other, wherein the optimization unit includes an image editing unit for editing output image data which is the output visual data so that the second gesture occurs before the first gesture.

11. The information processing device according to claim 10, wherein the processor is further configured to execute at least one of edit robot motion command data which is the output visual data, edit text data to generate the output speech data, and edit the output speech data.

12. The information processing device according to claim 11, wherein the processor is further configured to:

compare the difference in output timing between the second visual information and the second auditory information with a threshold, both of which correspond to the first visual information and the first auditory information that are associated with each other, and upon determining that the difference in output timing is greater than the threshold, edit the output visual data, edit the text data, and edit the output speech.

13. The information processing device according to claim 11, wherein the first visual information is the same as the second visual information, and wherein the processor is further configured to:

output image data by performing editing on the input image data to change the temporal relationship in such a way that the first visual information included in the input image data is replaced with the second visual information.

14. The information processing device according to claim 11, wherein the processor is further configured to output speech data by changing text data for generating the output speech data by changing a candidate of a translation result in the translation unit, or by changing the order of words in the text data.

* * * * *